US011807708B2

(12) United States Patent
Cummings et al.

(10) Patent No.: US 11,807,708 B2
(45) Date of Patent: Nov. 7, 2023

(54) FLEXIBILIZING CAPPED PREPOLYMERS

(71) Applicant: Covestro LLC, Pittsburgh, PA (US)

(72) Inventors: Stephen D. Cummings, Pittsburgh, PA (US); Matthew Stewart, Pittsburgh, PA (US); Sharlene A. Lewis, Pittsburgh, PA (US); Rick L. Adkins, Canonsburg, PA (US); Jack R. Reese, Coraopolis, PA (US)

(73) Assignee: Covestro LLC, Pittsburgh, PA (US)

( * ) Notice: Subject to any disclaimer, the term of this patent is extended or adjusted under 35 U.S.C. 154(b) by 167 days.

(21) Appl. No.: 17/178,793

(22) Filed: Feb. 18, 2021

(65) Prior Publication Data

US 2021/0253778 A1 Aug. 19, 2021

Related U.S. Application Data

(60) Provisional application No. 62/978,346, filed on Feb. 19, 2020, provisional application No. 62/978,348, filed on Feb. 19, 2020, provisional application No. 62/978,354, filed on Feb. 19, 2020.

(51) Int. Cl.
| | | |
|---|---|---|
| C08G 18/73 | (2006.01) | |
| C08G 18/48 | (2006.01) | |
| C08G 18/83 | (2006.01) | |
| C09J 163/00 | (2006.01) | |
| C08G 18/24 | (2006.01) | |
| C08G 18/28 | (2006.01) | |
| C08G 18/32 | (2006.01) | |
| C08G 18/36 | (2006.01) | |

(52) U.S. Cl.
CPC ......... *C08G 18/73* (2013.01); *C08G 18/4825* (2013.01); *C08G 18/831* (2013.01); *C08G 18/833* (2013.01); *C09J 163/00* (2013.01); *C08G 2170/00* (2013.01)

(58) Field of Classification Search
None
See application file for complete search history.

(56) References Cited

U.S. PATENT DOCUMENTS

| | | | |
|---|---|---|---|
| 5,278,257 A | 1/1994 | Muelhaupt et al. | |
| 8,404,787 B2 | 3/2013 | Lutz et al. | |
| 9,221,969 B2 | 12/2015 | Kramer et al. | |
| 2002/0169272 A1* | 11/2002 | Rappoport | C08G 18/36 528/49 |
| 2008/0099342 A1* | 5/2008 | Nishiguchi | C25D 13/16 205/317 |
| 2016/0009852 A1* | 1/2016 | Yu | C08G 18/4854 528/68 |
| 2018/0251633 A1 | 9/2018 | Lutz et al. | |

FOREIGN PATENT DOCUMENTS

| | | | | |
|---|---|---|---|---|
| CA | 1334700 C | * | 3/1995 | ............. C08G 18/10 |
| CN | 104262671 A | | 1/2015 | |
| CN | 108586667 A | * | 9/2018 | .......... C08F 283/008 |

OTHER PUBLICATIONS

Ghosh et al., "Cashew nut shell liquid terminated self-healable polyurethane as an effective anticorrosive coating with biodegradable attribute," Progress in Organic Coatings, vol. 139, pp. 1-11, available online Dec. 6, 2019 (Year: 2020).*
International Search Report for PCT/US2021/018536 dated May 31, 2021 by Authorized officer Sutterlin, Martin.

* cited by examiner

*Primary Examiner* — Randy P Gulakowski
*Assistant Examiner* — Ha S Nguyen
(74) *Attorney, Agent, or Firm* — Jed C. Benson; Richard P. Bender

(57) ABSTRACT

A flexibilizing capped prepolymer can include a reaction product of reaction mixture including a polyisocyanate and an isocyanate-reactive component at an equivalent ratio of polyisocyanate equivalents to isocyanate-reactive component equivalents of from 1.4:1 to 2.1:1. The isocyanate-reactive component can include a polyol component and a branching agent component. The branching agent component can include a monoglyceride, a diglyceride, a triglyceride, or a combination thereof having a number average functionality of from 3 to 6 NCO-reactive functional groups. The reaction product is terminated with a capping agent to form the flexibilizing capped prepolymer.

20 Claims, No Drawings

FLEXIBILIZING CAPPED PREPOLYMERS

RELATED APPLICATIONS

This application claims the benefit of U.S. Provisional Application Ser. No. 62/978,346, filed Feb. 19, 2020, U.S. Provisional Application Ser. No. 62/978,348, filed Feb. 19, 2020, and U.S. Provisional Application Ser. No. 62/978,354, filed Feb. 19, 2020, each of which is incorporated herein by reference.

BACKGROUND

A structural adhesive is an adhesive that is intended to cure to hold two or more substrates together for the lifetime of the product. Thus, structural adhesives are intended to withstand impact, vibration, temperature variations, chemical exposure, and various other potentially weakening or destructive events.

As one non-limiting example, structural adhesives are used in the manufacture of vehicles to provide further structural integrity in addition to mechanical fasteners, welds, etc. As such, structural adhesives in the automotive industry are intended to withstand both high static and high dynamic loads at temperatures ranging from hot to cold. Traditional structural adhesives are epoxy-based adhesives that generally have low impact peel strength. As such, it can be advantageous to add a flexibilizing capped prepolymer to the epoxy-based structural adhesive to improve the impact peel strength.

DESCRIPTION OF EMBODIMENTS

Although the following detailed description contains many specifics for the purpose of illustration, a person of ordinary skill in the art will appreciate that many variations and alterations to the following details can be made and are considered to be included herein. Accordingly, the following embodiments are set forth without any loss of generality to, and without imposing limitations upon, any claims set forth. It is also to be understood that the terminology used herein is for the purpose of describing particular embodiments only, and is not intended to be limiting. Unless defined otherwise, all technical and scientific terms used herein have the same meaning as commonly understood by one of ordinary skill in the art to which this disclosure belongs.

As used in this written description, the singular forms "a," "an" and "the" include express support for plural referents unless the context clearly dictates otherwise. Thus, for example, reference to "a polymer" or "the polymer" can include a plurality of such polymers.

In this application, "comprises," "comprising," "containing" and "having" and the like can have the meaning ascribed to them in U.S. Patent law and can mean "includes," "including," and the like, and are generally interpreted to be open ended terms. The terms "consisting of" or "consists of" are closed terms, and include only the components, structures, steps, or the like specifically listed in conjunction with such terms, as well as that which is in accordance with U.S. Patent law. "Consisting essentially of" or "consists essentially of" have the meaning generally ascribed to them by U.S. Patent law. In particular, such terms are generally closed terms, with the exception of allowing inclusion of additional items, materials, components, steps, or elements, that do not materially affect the basic and novel characteristics or function of the item(s) used in connection therewith. For example, trace elements present in a composition, but not affecting the compositions nature or characteristics would be permissible if present under the "consisting essentially of" language, even though not expressly recited in a list of items following such terminology. When using an open ended term, like "comprising" or "including," in this written description it is understood that direct support should be afforded also to "consisting essentially of" language as well as "consisting of" language as if stated explicitly and vice versa.

The terms "first," "second," "third," "fourth," and the like in the description and in the claims, if any, are used for distinguishing between similar elements and not necessarily for describing a particular sequential or chronological order. It is to be understood that any terms so used are interchangeable under appropriate circumstances such that the embodiments described herein are, for example, capable of operation in sequences other than those illustrated or otherwise described herein. Similarly, if a method is described herein as comprising a series of steps, the order of such steps as presented herein is not necessarily the only order in which such steps may be performed, and certain of the stated steps may possibly be omitted and/or certain other steps not described herein may possibly be added to the method.

As used herein, the term "substantially" refers to the complete or nearly complete extent or degree of an action, characteristic, property, state, structure, item, or result. For example, an object that is "substantially" enclosed would mean that the object is either completely enclosed or nearly completely enclosed. The exact allowable degree of deviation from absolute completeness may in some cases depend on the specific context. However, generally speaking the nearness of completion will be so as to have the same overall result as if absolute and total completion were obtained. The use of "substantially" is equally applicable when used in a negative connotation to refer to the complete or near complete lack of an action, characteristic, property, state, structure, item, or result. For example, a composition that is "substantially free of" particles would either completely lack particles, or so nearly completely lack particles that the effect would be the same as if it completely lacked particles. In other words, a composition that is "substantially free of" an ingredient or element may still actually contain such item as long as there is no measurable effect thereof.

As used herein, the term "about" is used to provide flexibility to a numerical range endpoint by providing that a given value may be "a little above" or "a little below" the endpoint. Unless otherwise stated, use of the term "about" in accordance with a specific number or numerical range should also be understood to provide support for such numerical terms or range without the term "about". For example, for the sake of convenience and brevity, a numerical range of "about 50 milligrams to about 80 milligrams" should also be understood to provide support for the range of "50 milligrams to 80 milligrams." Furthermore, it is to be understood that in this specification support for actual numerical values is provided even when the term "about" is used therewith. For example, the recitation of "about" 30 should be construed as not only providing support for values a little above and a little below 30, but also for the actual numerical value of 30 as well. Unless otherwise specified, all numerical parameters are to be understood as being prefaced and modified in all instances by the term "about," in which the numerical parameters possess the inherent variability characteristic of the underlying measurement techniques used to determine the numerical value of the parameter.

As used herein, a plurality of items, structural elements, compositional elements, and/or materials may be presented in a common list for convenience. However, these lists should be construed as though each member of the list is individually identified as a separate and unique member. Thus, no individual member of such list should be construed as a de facto equivalent of any other member of the same list solely based on their presentation in a common group without indications to the contrary.

Concentrations, amounts, and other numerical data may be expressed or presented herein in a range format. It is to be understood that such a range format is used merely for convenience and brevity and thus should be interpreted flexibly to include not only the numerical values explicitly recited as the limits of the range, but also to include all the individual numerical values or sub-ranges encompassed within that range as if each numerical value and sub-range is explicitly recited. As an illustration, a numerical range of "1 to 5" should be interpreted to include not only the explicitly recited values of 1 to 5, but also include individual values and sub-ranges within the indicated range. Thus, included in this numerical range are individual values such as 2, 3, and 4 and sub-ranges such as from 1-3, from 2-4, and from 3-5, etc., as well as 1, 2, 3, 4, and 5, individually.

This same principle applies to ranges reciting only one numerical value as a minimum or a maximum. Furthermore, such an interpretation should apply regardless of the breadth of the range or the characteristics being described.

Reference throughout this specification to "an example" means that a particular feature, structure, or characteristic described in connection with the example is included in at least one embodiment. Thus, appearances of the phrases "in an example" in various places throughout this specification are not necessarily all referring to the same embodiment.

EXAMPLE EMBODIMENTS

An initial overview of invention embodiments is provided below and specific embodiments are then described in further detail. This initial summary is intended to aid readers in understanding the technological concepts more quickly, but is not intended to identify key or essential features thereof, nor is it intended to limit the scope of the claimed subject matter.

The present disclosure is directed to flexibilizing capped prepolymers, associated structural adhesives, and associated methods. For illustrative purposes, and without intending to be limited thereby, some of the benefits of the flexibilizing capped prepolymers may be described herein in the context of the automotive industry. However, the disclosed flexibilizing capped prepolymers and associated structural adhesives can also have applications and benefits in a variety of fields outside of the automotive industry.

Generally, the flexibilizing capped prepolymers described herein can be a reaction product of a reaction mixture including a polyisocyanate and an isocyanate-reactive component. The isocyanate-reactive component can include a polyol component and a branching agent component. The polyisocyanate and the isocyanate-reactive component can be combined at an equivalent ratio of polyisocyanate equivalents to isocyanate-reactive component equivalents of from 1.3:1 to 2.1:1. Thus, the initial reaction product can be an NCO-functional prepolymer. The reaction product or NCO-functional prepolymer can then be terminated with a capping agent to form the flexibilizing capped prepolymer.

In further detail, the polyisocyanate employed to produce the flexibilizing capped prepolymer is not particularly limited. As used herein, the term "polyisocyanate" refers to compounds comprising at least two un-reacted isocyanate groups. Polyisocyanates include diisocyanates and diisocyanate reaction products including, for example, biuret, isocyanurate, uretdione, urethane, urea, iminooxadiazine dione, oxadiazine dione, carbodiimide, acyl urea, allophanate groups, the like, or a combination thereof.

A few non-limiting examples of polyisocyanates that can be used to produce the flexibilizing capped prepolymer are 1,4-tetramethylene diisocyanate, 1,5-pentamethylene diisocyanate, 1,6-hexamethylene diisocyanate, 2,2,4-trimethyl-1,6-hexamethylene diisocyanate, 1,12-dodecamethylene diisocyanate, cyclohexane-1,3- and -1,4-diisocyanate, 1-isocyanato-2-isocyanatomethyl cyclopentane, 1-isocyanato-3-isocyanatomethyl-3,5,5-trimethyl-cyclohexane (isophorone diisocyanate or IPDI), 1,3- and 1,4-bis (isocyanatomethyl)-cyclohexane, bis(4-isocyanatocyclohexyl)-methane, 2,4'-diisocyanatodicyclohexyl methane, bis(4-isocyanato-3-methyl-cyclohexyl)-methane, α,α,α',α'-tetramethyl-1,3- and/or -1,4-xylylene diisocyanate, 1-isocyanato-1-methyl-4(3)-isocyanatomethyl cyclohexane, 2,4- and/or 2,6-hexahydrotoluylene diisocyanate, 1,3- and/or 1,4-phenylene diisocyanate, 2,4- and/or 2,6-toluylene diisocyanate, 2,4- and/or 4,4'-diphenylmethane diisocyanate, 1,5-diisocyanato naphthalene, the like, or mixtures thereof.

Monomeric polyisocyanates containing 3 or more isocyanate groups such as 4-isocyanatomethyl-1,8-octamethylene diisocyanate and aromatic polyisocyanates such as 4,4',4"-triphenylmethane triisocyanate and polyphenyl polymethylene polyisocyanates obtained by phosgenating aniline/formaldehyde condensates may also be used.

Polyisocyanate adducts may also be used. Non-limiting examples of polyisocyanate adducts can include isocyanurate groups, uretdione groups, biuret groups, allophanate groups, iminooxadiazine dione groups, carbodiimide groups, oxadiazine trione groups, the like, or a combination thereof.

In some specific examples, the polyisocyanate can be or include an aliphatic polyisocyanate. In some additional specific examples, the polyisocyanate can be or include 1,5-pentamethylene diisocyanate, 1,6-hexamethylene diisocyanate, or a combination thereof. In some examples, the polyisocyanate can be or include 1,6-hexamethylene diisocyanate. In still additional examples, the polyisocyanate can be or include 1,5-pentamethylene diisocyanate.

The polyisocyanate can be combined with an isocyanate-reactive component, which can be allowed to react to produce an NCO-functional prepolymer. In further detail, the polyisocyanate and the isocyanate-reactive component can be combined at an equivalent ratio NCO:OH (or NCO:NH) of from 1.3:1 to 2.1:1. In some additional examples, the polyisocyanate and the combination of components can be combined at an equivalent NCO:OH (or NCO:NH) ratio of from 1.7:1 to 2.1:1.

The isocyanate-reactive component can include a polyol component. Generally, the polyol component can include a polyether, a polyester, a polycarbonate, a polycarbonate ester, a polycaprolactone, a polybutadiene, the like, or a combination thereof. Thus, a variety of polyol components can be employed. In some specific examples, the polyol component can include polytetramethylene ether glycol (PTMG), poly(butylene glycol), polypropylene glycol (PPG), polybutadiene, poly(1,2-butylene glycol), poly(2,3-butylene glycol), poly(1,3-propylene glycol), polyethylene glycol, a hydroxyl-functionalized polydimethylsiloxane, an amine-functionalized polydimethylsiloxane, the like, or a combination thereof. In some specific examples, the polyol component can include PTMG. In some additional examples, the polyol component can include PPG. In still additional examples, the polyol component can include polybutadiene. In yet further examples, the polyol component can include poly(1,2-butylene glycol). In some additional examples, the polyol can have a number average molecular weight of from 500 g/mol to 5000 g/mol, or from 1000 g/mol to 3000 g/mol based on gel permeation chromatography.

It has been discovered that including an amorphous polyol in the flexibilizing capped prepolymer can improve the low-temperature high impact peel strength performance of the corresponding structural adhesive. For example, in some cases, the amorphous polyol can decrease the melting temperature and/or the crystallization temperature of the flexibilizing capped prepolymer, which can help impart greater flexibility (and reduced brittleness) to the corresponding structural adhesive at low temperatures. Thus, in some specific examples, the polyol component can be selected to decrease the melting temperature and/or crystallization temperature of the flexibilizing capped prepolymer. Where this is the case, the polyol component can include at least 5 wt %, or at least 10 wt %, or at least 15 wt % of an amorphous polyol based on a total weight of the polyol component. In some specific examples, the highly amorphous polyol can be or include poly(butylene glycol), polypropylene glycol (PPG), polybutadiene, poly(1,2-butylene glycol), poly(2,3-butylene glycol), poly(1,3-propylene glycol), polyethylene glycol, a hydroxyl-functionalized polydimethylsiloxane, an amine-functionalized polydimethylsiloxane, the like, or a combination thereof.

In some specific examples, the polyol component can include from 15 wt % to 50 wt %, or from 20 wt % to 40 wt %, based on a total weight of the polyol component, of PPG having a number average molecular weight of from 500 g/mol to 5000 g/mol, or from 1000 g/mol to 3000 g/mol, based on gel permeation chromatography. In some additional examples, PPG can be included in the polyol component in an amount to achieve a flexibilizing capped prepolymer having a glass transition temperature ($T_g$) of less than or equal to −50° C. In some additional examples, PPG can be included in the polyol component in an amount to achieve a flexibilizing capped prepolymer having a $T_g$ of less than or equal to −70° C. In some specific examples, PPG can be included in the polyol component in an amount to achieve a flexibilizing capped prepolymer having a $T_g$ of from −50° C. to −90° C. Additionally, in some examples, PPG can be included in the polyol component in an amount to achieve a flexibilizing capped prepolymer having a crystallization temperature of less than or equal to −90° C. In some additional examples, PPG can be included in the polyol component in an amount to achieve a flexibilizing capped prepolymer having a crystallization temperature of less than or equal to −120° C. In some specific examples, PPG can be included in the polyol component in an amount to achieve a flexibilizing capped prepolymer having a crystallization temperature of from −90° C. to −150° C. Where used, the PPG can be optionally included in the polyol component in combination with a variety of additional polyols, such as one or more of those described above, for example. In some specific examples, the polyol component can include an additional polyether polyol, such as PTMG, having a number average molecular weight of from 500 g/mol to 5000 g/mol, or from 1000 g/mol to 3000 g/mol based on gel permeation chromatography. In some additional specific examples, the additional polyether polyol can be present in the polyol component in an amount of from 50 wt % to 85 wt % based on a total weight of the polyol component.

A variety of branching agents can also be included in the isocyanate-reactive component used to prepare the flexibilizing capped prepolymer. Non-limiting examples of branching agents can include 1,1,1-trimethylolethane, 1,1,1-trimethylolpropane (TMP), 1,2,6-hexanetriol, glycerol, pentaerythritol, sorbitol, a monoglyceride, a diglyceride, a triglyceride, other hydroxyl- or amine-functional molecules having from 3 isocyanate-reactive equivalents to 6 isocyanate-reactive equivalents and a number average molecular weight of from 50 g/mol to 3000 g/mol based on gel permeation chromatography, the like, or a combination thereof.

It has been discovered that selecting a hydrophobic branching agent for use in preparing the flexibilizing capped prepolymer can increase the high impact peel strength of the corresponding structural adhesive. More specifically, it has been discovered that increasing the hydrophobicity of the flexibilizing capped prepolymer used in the structural adhesive can improve the degree of contact between the structural adhesive and metallic subassemblies, which can improve the high impact peel strength and various other properties of the structural adhesive. Without wishing to be bound by theory, it is believed that when the flexibilizing capped prepolymer is overly hydrophilic, it can draw moisture into the uncured structural adhesive, especially in humid environments. The moisture can then be evolved as vapor when the adhesive is cured, which can cause loss of contact between the structural adhesive and the metallic substrates. Thus, increasing the hydrophobicity of the flexibilizing capped prepolymer can help remedy this problem.

With this in mind, in some examples, the branching agent component can be or include a hydrophobic constituent. For example, in some cases, the branching agent component can be or include a monoglyceride (e.g., a 1-monoglyceride, a 2-monoglyceride), a diglyceride (e.g., a 1,2-diglyceride, a 1,3-diglyceride), a triglyceride, or a combination thereof. In some specific examples, the branching agent component can include from 60 wt % to 100 wt % or from 80 wt % to 100 wt % of a monoglyceride, a diglyceride, a triglyceride, or a combination thereof based on a total weight of the branching agent component. Non-limiting examples of monoglycerides, diglycerides, or triglycerides can include monolaurin, glycerol monostearate, glyceryl hydroxystearate, glycerol monocaprylocaprate, glycerol monopalmitate, glycerol monooleate, glycerol monoeladiate, glycerol dicaprylate, glycerol distearate, glycerol dipalmitate, glyceryl dioleate, glyceryl dilaurate, aceituno oil, almond oil, arachis oil, babassu oil, blackcurrant seed oil, borage oil, buffalo ground oil, candlenut oil, canola oil, castor oil, Chinese vegetable tallow oil, cocoa butter, coconut oil, coffee seed oil, corn oil, cottonseed oil, Crambe oil, Cuphea species oil, evening primrose oil, grapeseed oil, groundnut oil, hemp seed oil, Illipe butter, kapok seed oil, linseed oil, mowrah butter, mustard seed oil, oiticica oil, olive oil, palm oil, palm kernel oil, peanut oil, poppy seed oil, rapeseed oil, rice bran oil, safflower oil, sal fat, sesame oil, shark liver oil, shea nut oil, soybean oil, Stillingia oil, sunflower oil, tall oil, sea seed oil, tobacco seed oil, tung oil, ucuhuba Vernonia oil, wheat germ oil, hydrogenated castor oil, hydrogenated coconut oil, hydrogenated cottonseed oil, hydrogenated palm oil, hydrogenated soybean oil, hydrogenated vegetable oil, partially hydrogenated soybean oil, glyceryl tributyrate, glyceryl tricaproate, glyceryl tricaprylate, glyceryl tricaprate, glyceryl triundecanoate, glyceryl trilaurate, glyceryl trimyristate, glyceryl tripalmitate, glyceryl tristearate, glyceryl triarchidate, glyceryl trimyristoleate, glyceryl tripalmitoleate, glyceryl trioleate, glyceryl trilinoleate, glyceryl trilinolenate, glyceryl tricaprylate, glyceryl 1,2-caprylate-3-linoleate, glyceryl 1,2-caprate-3-stearate, glyceryl 1,2-laurate-3-myristate, glyceryl 1,2-myristate-3-laurate, glyceryl 1,3-palmitate-2-butyrate, glyceryl 1,3-stearate-2-caprate, glyceryl 1,2-linoleate-3-caprylate, lesquerella oil, lequerolic acid, the like, or a mixture thereof.

Where the branching agent is or includes a monoglyceride, a diglyceride, a triglyceride, or a combination thereof, the branching agent can generally have a number average functionality of from 3 to 6 NCO-reactive functional groups as determined by gel permeation chromatography or other suitable method. In some additional examples, where the branching agent is or includes a monoglyceride, a diglyceride, a triglyceride, or a combination thereof, the branching agent can have a number average functionality of from 3 to 5 or from 4 to 6 NCO-reactive functional groups. In some specific examples, the branching agent can have a number average functionality of 3, 4, 5, or 6 NCO-reactive functional groups. In some additional specific examples, the branching agent can have a number average functionality of 3 NCO-reactive functional groups.

In some examples, the branching agent can have a number average molecular weight of from 150 g/mol to 3000 g/mol based on gel permeation chromatography or other suitable method. In some additional examples, the branching agent can have a number average molecular weight of from 200 g/mol to 2500 g/mol, from 500 g/mol to 2000 g/mol, or from 800 g/mol to 1500 g/mol. In some specific examples, the branching agent can have a number average molecular weight of from 200 g/mol to 1200 g/mol, from 500 g/mol to 1500 g/mol, from 800 g/mol to 1800 g/mol, or from 1200 g/mol to 2400 g/mol.

In some specific examples, the branching agent is or includes a triglyceride. In some further specific examples, the branching agent is or includes castor oil.

It is noted that the various components of the NCO-functional prepolymer can be combined in a variety of ratios. For example, the polyol component and the branching agent component can generally be combined at an equivalent ratio of polyol equivalents to branching agent equivalents of from 1:0.01 to 1:0.4. In some further examples, the polyol component and the branching agent component can be combined at an equivalent ratio of polyol equivalents to branching agent equivalents of from 1:0.01 to 1:0.1, from 1:0.05 to 1:0.2, from 1:0.1 to 1:0.3, or from 1:0.2 to 1:0.4.

In some additional examples, the polyisocyanate and the polyol component can generally be combined at an equivalent ratio of polyisocyanate equivalents to polyol component equivalents of from 1.3:0.45 to 2.4:0.01. In some further examples, the polyisocyanate and the polyol component can be combined at an equivalent ratio of polyisocyanate equivalents to polyol component equivalents of from 1.3:0.45 to 1.9:0.1 or from 1.8:0.2 to 2.4:0.01.

In still additional examples, the polyisocyanate and the branching agent component can generally be combined at an equivalent ratio of polyisocyanate equivalents to branching agent component equivalents of from 1.3:0.45 to 2.4:0.01. In some further examples, the polyisocyanate and the branching agent component can be combined at an equivalent ratio of polyisocyanate equivalents to branching agent component equivalents of from 1.3:0.45 to 1.9:0.1 or from 1.8:0.2 to 2.4:0.01.

In some additional examples, the isocyanate-reactive component can also include a chain extender. Non-limiting examples of chain extenders can include 1,4-butanediol, 1,6-hexanediol, ethylenediamine, 1,6-hexylenediamine, the like, or a combination thereof.

The resulting NCO-functional prepolymer can be capped with a variety of capping agents to prepare the flexibilizing capped prepolymer. Generally, an amount of capping agent can be added to the NCO-functional prepolymer to react with and terminate all of the remaining NCO-functional groups. In some examples, the NCO-functional prepolymer can be combined with a capping agent at an equivalent ratio of NCO-functional prepolymer equivalents to capping agent equivalents of from 1:0.9 to 1:1.2 to terminate the NCO-functional prepolymer to form the flexibilizing prepolymer.

The capping agents can affect the flexibilizing capped prepolymer in a number of ways, such as by improving initial low-temperature impact performance and/or stabilizing impact performance over time. Non-limiting examples of capping agents can include nonylphenol, cashew nut shell liquid, p-cresol, m-cresol, o-cresol, morpholine, 4-hydroxypiperidine, diethanolamine, 4-(2-Hydroxyethyl)morpholine, 1-methypiperazine, 1-ethypiperazine, 1-(2-Hydroxyethyl)piperidine, Glycerol formal, 1-(2-Hydroxyethyl)-pyrrolidine, 1-(2-Hydroxyethyl)-2-pyrrolidone, 2-(Diisopropylamine)ethanol, 4-(Hydoxymethy)-1,3-dioxolan-2-one, 2-oxazolidinone, 4-Ethylphenol, 2-Ethylphenol, 3-Ethylphenol, ε-Caprolactam, 3,5-Dimethylpyrazole, 4-Cumylphenol, napthol, the like, or mixtures thereof.

In some specific examples, the capping agent can be or include cashew nut shell liquid, p-cresol, m-cresol, o-cresol, 4-hydroxypiperidine, the like, or a combination thereof. In some additional specific examples, the capping agent can be or include cashew nut shell liquid. Where this is the case, the capping agent can generally include at least 5 wt % of cashew nut shell liquid based on a total weight of the capping agent. In some examples, where the capping agent includes cashew nut shell liquid, the capping agent can include from 5 wt % to 100 wt % cashew nut shell liquid based on a total weight of the capping agent. In some further examples, the capping agent can include from 10 wt % to 90 wt %, from 15 wt % to 85 wt %, from 20 wt % to 80 wt %, or from 25 wt % to 75 wt % cashew nut shell liquid based on a total weight of the capping agent. In some examples, the capping agent can include at least 50 wt %, at least 60 wt %, at least 70 wt %, or at least 80 wt % cashew nut shell liquid based on a total weight of the capping agent. In some specific examples, the capping agent can include from 40 wt % to 60 wt %, from 50 wt % to 70 wt %, from 60 wt % to 80 wt %, or from 70 wt % to 90 wt % cashew nut shell liquid based on a total weight of the capping agent.

In some additional examples, the capping agent can include p-cresol, m-cresol, o-cresol, or a combination thereof. Where this is the case, p-cresol, m-cresol, o-cresol, or a combination thereof can generally be included in the capping agent in an amount of at least 5 wt % based on a total weight of the capping agent. In some examples, where the capping agent includes p-cresol, m-cresol, o-cresol, or a combination thereof, the capping agent can include from 5 wt % to 100 wt % of p-cresol, m-cresol, o-cresol, or a combination thereof based on a total weight of the capping agent. In some further examples, the capping agent can include from 10 wt % to 90 wt %, from 15 wt % to 85 wt %, from 20 wt % to 80 wt %, or from 25 wt % to 75 wt % p-cresol, m-cresol, o-cresol, or a combination thereof based on a total weight of the capping agent. In some examples, the capping agent can include at least 20 wt %, at least 30 wt %, at least 40 wt %, or at least 50 wt % p-cresol, m-cresol, o-cresol, or a combination thereof based on a total weight of the capping agent. In some specific examples, the capping agent can include from 10 wt % to 30 wt %, from 20 wt % to 40 wt %, from 30 wt % to 50 wt %, or from 40 wt % to 60 wt % p-cresol, m-cresol, o-cresol, or a combination thereof based on a total weight of the capping agent. In some specific examples, the capping agent can be or include p-cresol. In some additional examples, the capping agent can be or include m-cresol. In some further examples, the capping agent can be or include o-cresol.

In some examples, the capping agent can include a blend of cashew nut shell liquid and p-cresol, m-cresol, o-cresol, or a combination thereof. Where this is the case, the capping agent can generally include a weight ratio of cashew nut shell liquid to p-cresol, m-cresol, o-cresol, or a combination thereof of from 10:1 to 1:10. In some examples, the capping agent can include a weight ratio of cashew nut shell liquid to p-cresol, m-cresol, o-cresol, or a combination thereof of from 10:1 to 2:1, from 4:1 to 1:1, from 2:1 to 1:2, or from 1:1 to 1:4.

The flexibilizing capped prepolymer can generally have a viscosity that will not adversely affect the viscosity of a corresponding structural adhesive. With this in mind, the flexibilizing capped prepolymer can generally have a viscosity of from 1 centipoise (cP) to 60,000 cP at 60° C. based on ASTM D4878-15.

The present disclosure is also directed to methods of manufacturing flexibilizing capped prepolymers. The methods can generally include catalyzing a reaction between a polyisocyanate and an isocyanate-reactive component at an equivalent ratio of polyisocyanate equivalents to isocyanate-reactive component equivalents of from 1.4:1 to 2.1:1 to form or produce an NCO-functional prepolymer. The isocyanate-reactive component can include a polyol component and a branching agent component. The NCO-functional prepolymer can be combined with a capping agent at an equivalent ratio of NCO-functional prepolymer equivalents to capping agent equivalents of from 1:0.9 to 1:1.2 to terminate the NCO-functional prepolymer to form the flexibilizing prepolymer.

In further detail, catalyzing the reaction between the polyisocyanate and the isocyanate-reactive component to form the NCO-functional prepolymer can be performed using a variety of catalysts. Non-limiting examples can include bismuth neodecanoate catalyst, bismuth carboxylate catalyst, dibutyltin mercaptide catalyst, dibutyltin dilaurate, the like, or a combination thereof. In some specific examples, the catalyst can be or include dibutyltin dilaurate.

Catalyzing the reaction can be performed at a variety of temperatures. For example, in some cases, catalyzing the reaction can be performed at a temperature of from 40° C. to 120° C. In some specific examples, catalyzing the reaction can be performed at a temperature of from 40° C. to 60° C., from 60° C. to 80° C., from 80° C. to 100° C., or from 100° C. to 120° C.

The resulting NCO-functional prepolymer can be combined with capping agent to form the flexibilizing capped prepolymer. In some examples, the NCO-functional prepolymer can be combined with a capping agent at an equivalent ratio of NCO-functional prepolymer equivalents to capping agent equivalents of from 1:0.9 to 1:1.2 to terminate the NCO-functional prepolymer to form the flexibilizing capped prepolymer. In some specific examples, the NCO-functional prepolymer can be combined with a capping agent at an equivalent ratio of NCO-functional prepolymer equivalents to capping agent equivalents of from 1:0.9 to 1:1.1, from 1:1 to 1:1.2, or from 1:1.05 to 1:1.2 to terminate the NCO-functional prepolymer to form the flexibilizing capped prepolymer.

The capping agent can be added to the NCO-functional prepolymer at a variety of temperatures. In some examples, combining the NCO-functional prepolymer with the capping agent can be performed at a temperature of from 40° C. to 120° C. In some additional examples, combining the NCO-functional prepolymer with the capping agent can be performed at a temperature of from 40° C. to 90° C., from 50° C. to 100° C., 60° C. to 110° C., or from 70° C. to 120° C.

The present disclosure is also directed to a one-component (1K) structural adhesive. As described above, epoxy structural adhesives can be used to support the strength of spot-welded metallic subassemblies in automotive body shop construction. Generally, these structural adhesives can be 1K, highly viscous mixtures. The inclusion of a structural adhesive can provide added structural integrity to otherwise mechanically connected and/or welded subassemblies.

The structural adhesives described herein can generally include a flexibilizing capped prepolymer as described herein. The flexibilizing capped prepolymer can typically be included in the structural adhesive in an amount of from 4 wt % to 15 wt % based on a total weight of the structural adhesive. In some specific examples, the flexibilizing capped prepolymer can be included in the structural adhesive in an amount of from 4 wt % to 10 wt % or from 6 wt % to 12 wt % based on a total weight of the structural adhesive.

The structural adhesives can also include a variety of additional components. Non-limiting examples of additional components can include an epoxide resin, a rubber toughener, a hardener, a filler, the like, or a combination thereof.

In further detail, epoxide resins included in the 1K structural adhesive are not particularly limited. For example, in some cases, the epoxide resin can include a polyglycidyl ester, a poly-(β-methylglycidyl) ester, or the like, which can be obtained by combining a compound having at least two carboxyl groups with epichlorohydrin, β-methylepichlorohydrin, or the like and allowing the compounds to react. In some additional examples, the epoxide resin can include a polyglycidyl ether, a poly-β-methylglycidyl ether, or the like, which can be obtained by combining a compound having at least two alcoholic hydroxyl groups and/or phenolic hydroxyl groups with epichlorohydrin, β-methylepichlorohydrin, or the like and allowing the compounds to react. In further examples, the epoxide resin can include poly-(N-glycidyl) compounds that can be obtained by dehydrochlorinating the reaction products of epichlorohydrin with an amine containing at least two amino hydrogen atoms. In still further examples, the epoxide resin can include a poly-(S-glycidyl) compound, such as those derived from dithiols, for example. In yet additional examples, the epoxide resin can include a cycloaliphatic epoxide resin, such as bis-(2,3-epoxy cyclopentyl) ethyer, 2,3-epoxycyclopentyl glycidyl ether, 1,2-bis-(2,3-epoxycyclopentyl oxy)-ethane, 3,4-epoxycyclohexylmethyl 3',4'-epoxycyclohexanecarboxylate, the like, or a combination thereof. Any of the above epoxide resins, or the like, can be employed individually or in combination in the structural adhesives described herein.

The epoxide resin can generally be included in the structural adhesive in an amount of from 30 wt % to 80 wt % based on a total weight of the structural adhesive. In some additional examples, epoxide resin can be included in the structural adhesive in an amount of from 30 wt % to 50 wt %, from 40 wt % to 60 wt %, from 50 wt % to 70 wt %, or from 60 wt % to 80 wt % based on a total weight of the structural adhesive.

A variety of suitable rubber tougheners can also be included in the structural adhesives disclosed herein. In some examples, the rubber toughener can include an acrylonitrile-butadiene rubber having from 5 wt % to 35 wt % acrylonitrile based on a total weight of the acrylonitrile-butadiene rubber. In some examples, the acrylonitrile-butadiene rubber can be a carboxy-terminated butadiene rubber. In some additional examples, the rubber toughener can include core-shell rubber particles, which are described in U.S. Pat. Nos. 5,290,857 and 5,686,509, for example, each of which is incorporated herein by reference.

The rubber toughener can typically be included in the structural adhesive in an amount of from 15 wt % to 45 wt % based on a total weight of the structural adhesive. In some further examples, the rubber toughener can be included in the structural adhesive in an amount of from 15 wt % to 25 wt %, from 20 wt % to 30 wt %, from 25 wt % to 35 wt %, from 30 wt % to 40 wt %, or from 35 wt % to 45 wt % based on a total weight of the structural adhesive.

Various hardeners can also be included in the structural adhesives. Non-limiting examples of hardeners can include dicyandiamide and other amines and amides, imidazoles, polyhydric phenols, polyanhydrides, the like, or a combination thereof.

Generally, the hardener can be included in the structural adhesives in an amount of from 2 wt % to 10 wt % based on a total weight of the structural adhesive. In some additional examples, the hardener can be included in the structural adhesives in an amount of from 2 wt % to 6 wt %, from 4 wt % to 8 wt %, or from 6 wt % to 10 wt % based on a total weight of the structural adhesive.

A variety of fillers can also be included in the structural adhesives. Non-limiting examples of fillers can include accelerators, adhesions promoters, epoxy silanes, fumed silicas, wetting agents, inorganic fillers, the like, or a combination thereof.

Fillers can typically be included in the structural adhesives in an amount of from 0.5 wt % to 8 wt % based on a total weight of the structural adhesive. In some additional examples, the filler can be included in the structural adhesive in an amount of from 0.5 wt % to 3 wt %, from 2 wt % to 4 wt %, from 3 wt % to 5 wt %, from 4 wt % to 6 wt %, from 5 wt % to 7 wt %, or from 6 wt % to 8 wt % based on a total weight of the structural adhesive.

EXAMPLES

Example 1—Branching Agent

The following reactions were carried out under nitrogen to prepare flexibilizing capped prepolymers:

Comparative Example 1—62.97 grams (g) of polytetramethylene glycol –2000 (PTMG-2000), 0.31 g of trimethylolpropane (TMP), and 11.52 g of hexamethylene diisocyanate (HDI) were weighed into a round bottom flask. The contents were heated to 50° C. 0.06 g of dibutyltin dilaurate were added. The reaction was held at 85° C. for one hour. 25.2 g of diallylbisphenol A were added and the reaction was continued for another 30 minutes. The resulting capped prepolymer was then decanted.

Inventive Example 1—65.27 grams (g) of PTMG-2000, 2.35 g of castor oil, and 11.43 g of HDI were weighed into a round bottom flask. The contents were heated to 50° C. 0.06 g of dibutyltin dilaurate were added. The reaction was held at 85° C. for one hour. 23.98 g of diallylbisphenol A were added and the reaction was continued for another 30 minutes. The resulting capped prepolymer was then decanted.

Structural adhesives were formulated with each of the respective flexibilizing capped prepolymers described above, as recited in Table 1:

TABLE 1

Structural Adhesives Formulations

| Component | Amount (wt %) |
|---|---|
| EPON 828 (from HEXION) | 53.5 |
| MX 154 (from KANE ACE) | 29 |
| Flexibilizing Capped Prepolymer | 8 |
| OMNICURE U52 (from EXCELITAS) | 1 |
| CAB-O-SIL TS 720 (from CABOT) | 4 |
| DYHARD 100S (from ALZCHEM) | 4.5 |

The structural adhesive formulated with Comparative Sample 1 is considered to be approximately equivalent to state-of-the-art structural adhesives in the market. Each of the structural adhesives were used to adhere two 5754 aluminum test substrates together. The adhered test substrates and matching non-adhered substrates were then stored at 35° C. at 85% R.H. for 2 days. High impact wedge peel testing was performed at day 0 and at day 2 for each of the structural adhesives at 25° C. and −40° C. The results of this testing is illustrated in Table 2:

TABLE 2

High Impact Wedge Peel with Branching Agent

| Sample | Timepoint | 25° C. (Joules) | −40° C. (Joules) |
|---|---|---|---|
| Comparative Sample 1 | Day 0 | 21.28 | 19.20 |
| | Day 2 | 14.57 | 15.47 |
| | Loss % | 31.55 | 19.44 |
| Inventive Sample 1 | Day 0 | 20.59 | 20.49 |
| | Day 2 | 16.75 | 16.67 |
| | Loss % | 18.68 | 18.61 |

As can be seen in Table 2, Inventive Sample 1 has superior performance to Comparative Sample 1 at both 25° C. and −40° C.

Example 2—Capping Agent

Additional flexibilizing capped prepolymers were prepared as described with respect to Inventive Sample 1. However, the diallylbisphenol A capping agent was replaced with various alternative capping agents as listed in Table 3:

TABLE 3

Capping Agent Formulations (Part 1)

| Sample | Capping Agent |
|---|---|
| Inventive Sample 2 | 100% p-Cresol |
| Inventive Sample 3 | 75% p-Cresol/25% Cashew Nut Shell Liquid |
| Inventive Sample 4 | 50% p-Cresol/50% Cashew Nut Shell Liquid |
| Inventive Sample 5 | 25% p-Cresol/75% Cashew Nut Shell Liquid |

TABLE 3-continued

Capping Agent Formulations (Part 1)

| Sample | Capping Agent |
|---|---|
| Inventive Sample 6 | 100% Cashew Nut Shell Liquid |
| Inventive Sample 7 | 100% o-Cresol |
| Inventive Sample 8 | 100% m-Cresol |

Structural adhesives were formulated with the flexibilizing capped prepolymers listed in Table 3. The structural adhesives were generally formulated as presented in Table 1. Each of the structural adhesives were used to adhere two 5754 aluminum test substrates together. The adhered test substrates and matching non-adhered substrates were then stored at 35° C. at 85% R.H. for 2 days. High impact wedge peel testing was performed at day 0 and at day 2 for each of the structural adhesives at 25° C. and −40° C. The results of this testing is illustrated in Table 4:

TABLE 4

High Impact Wedge Peel with Capping Agents (Part 1)

| Sample | Timepoint | 25° C. (Joules) | −40° C. (Joules) |
|---|---|---|---|
| Inventive Sample 2 | Day 0 | 24.79 | 23.46 |
| | Day 2 | 20.42 | 18.54 |
| | Loss % | 17.61 | 20.97 |
| Inventive Sample 3 | Day 0 | 25.34 | 21.90 |
| | Day 2 | 18.38 | 17.07 |
| | Loss % | 27.47 | 22.07 |
| Inventive Sample 4 | Day 0 | 22.79 | 20.13 |
| | Day 2 | 17.22 | 17.85 |
| | Loss % | 24.44 | 11.33 |
| Inventive Sample 5 | Day 0 | 20.19 | 20.60 |
| | Day 2 | 16.94 | 19.41 |
| | Loss % | 16.13 | 5.78 |
| Inventive Sample 6 | Day 0 | 22.87 | 18.44 |
| | Day 2 | 18.08 | 16.05 |
| | Loss % | 20.96 | 12.94 |
| Inventive Sample 7 | Day 0 | 23.41 | 22.90 |
| | Day 2 | 15.18 | 15.99 |
| | Loss % | 35.16 | 30.18 |
| Inventive Sample 8 | Day 0 | 24.20 | 20.54 |
| | Day 2 | 17.35 | 16.39 |
| | Loss % | 28.30 | 20.21 |

As can be seen from Table 4, each of Inventive Samples 2-8 had good performance at both 25° C. and −40° C.

Additional flexibilizing capped prepolymers were generally prepared as described with respect to Inventive Sample 1. However, a portion of the PTMG-2000 was replaced with polypropylene glycol −2000 (PPG-2000). Additionally, the diallylbisphenol A capping agent was replaced with various alternative capping agents as listed in Table 5:

TABLE 3

Capping Agent Formulations (Part 2)

| Sample | Capping Agent |
|---|---|
| Inventive Sample 9 | 4-hydroxypiperidine |
| Comparative Sample 2 | Diisopropylamine |
| Comparative Sample 3 | 4-(2-Hydroxyethyl)morpholine |
| Comparative Sample 4 | 1-Methypiperazine |
| Comparative Sample 5 | 1-Ethylpiperazine |
| Comparative Sample 6 | 1-(2-Hydroxyethyl)piperidine |
| Comparative Sample 7 | Glycerol formal |
| Comparative Sample 8 | 1-(2-Hydroxyethyl)-pyrrolidine |
| Comparative Sample 9 | 2-(Diisopropylamine)ethanol |
| Comparative Sample 10 | 1-(2-Hydroxyethyl)-2-pyrrolidone |
| Comparative Sample 11 | 4-(Hydroxymethyl)-1,3-dioxolan-2-one |

Structural adhesives were formulated with the flexibilizing capped prepolymers listed in Table 5. The structural adhesives were generally formulated as presented in Table 1. Each of the structural adhesives were used to adhere two 5754 aluminum test substrates together. The adhered test substrates and matching non-adhered substrates were then stored at 35° C. at 85% R.H. for 2 days. High impact wedge peel testing was performed at day 0 and at day 2 for each of the structural adhesives at 25° C. and −40° C. The results of this testing is illustrated in Table 6:

TABLE 6

High Impact Wedge Peel with Capping Agents (Part 2)

| Sample | Timepoint | 25° C. (Joules) | −40° C. (Joules) |
|---|---|---|---|
| Inventive Sample 9 | Day 0 | 23.04 | 21.14 |
| | Day 2 | 16.98 | 14.89 |
| | Loss % | 26.29 | 29.58 |
| Comparative Sample 2 | Day 0 | 18.27 | 23.83 |
| | Day 2 | 14.45 | 14.38 |
| | Loss % | 20.90 | 39.68 |
| Comparative Sample 3 | Day 0 | 19.06 | 18.62 |
| | Day 2 | 13.45 | 11.89 |
| | Loss % | 29.44 | 36.16 |
| Comparative Sample 4 | Day 0 | 10.70 | 9.23 |
| | Day 2 | 9.98 | 7.81 |
| | Loss % | 6.74 | 15.44 |
| Comparative Sample 5 | Day 0 | 20.64 | 23.45 |
| | Day 2 | 13.77 | 10.42 |
| | Loss % | 33.29 | 55.58 |
| Comparative Sample 6 | Day 0 | 18.89 | 21.93 |
| | Day 2 | 15.79 | 12.87 |
| | Loss % | 16.41 | 41.31 |
| Comparative Sample 7 | Day 0 | 13.72 | 12.00 |
| | Day 2 | 11.52 | 8.08 |
| | Loss % | 16.05 | 32.67 |
| Comparative Sample 8 | Day 0 | 16.47 | 19.04 |
| | Day 2 | 8.11 | 8.85 |
| | Loss % | 50.74 | 53.51 |
| Comparative Sample 9 | Day 0 | 7.20 | 7.86 |
| | Day 2 | 6.55 | 6.50 |
| | Loss % | 9.09 | 17.36 |
| Comparative Sample 10 | Day 0 | 10.31 | 10.80 |
| | Day 2 | 6.85 | 5.47 |
| | Loss % | 33.50 | 49.31 |
| Comparative Sample 11 | Day 0 | 20.60 | 22.18 |
| | Day 2 | 12.82 | 13.49 |
| | Loss % | 37.74 | 39.17 |

As can be seen from Table 6, Inventive Sample 9 had good performance at both 25° C. and −40° C.

It should be understood that the above-described methods are only illustrative of some embodiments of the present invention. Numerous modifications and alternative arrangements may be devised by those skilled in the art without departing from the spirit and scope of the present invention and the appended claims are intended to cover such modifications and arrangements. Thus, while the present invention has been described above with particularity and detail in connection with what is presently deemed to be the most practical and preferred embodiments of the invention, it will be apparent to those of ordinary skill in the art that variations including, may be made without departing from the principles and concepts set forth herein.

What is claimed is:

1. A flexibilizing capped prepolymer, comprising:
a reaction product of a polyisocyanate and an isocyanate-reactive component,
wherein the polyisocyanate and the isocyanate-reactive components are combined at an equivalent NCO:OH or NCO:NH ratio of polyisocyanate equivalents to isocyanate-reactive component equivalents of from 1.4:1 to 2.1:1,
wherein the isocyanate-reactive component comprises a polyol component and a branching agent component,
wherein the branching agent component has a number average functionality of from 3 to 6 NCO-reactive functional groups,
wherein the branching agent component comprises a monoglyceride, a diglyceride, a triglyceride, or a combination thereof,
wherein the reaction product is terminated with a capping agent to form the flexibilizing capped prepolymer, and
wherein the capping agent comprises cashew nut shell liquid and one or more of p-cresol, m-cresol, or o-cresol.

2. The flexibilizing capped prepolymer of claim 1, wherein the polyisocyanate comprises an aliphatic polyisocyanate.

3. The flexibilizing capped prepolymer of claim 1, wherein the polyol component comprises a polyether polyol having a number average molecular weight of from 500 g/mol to 5000 g/mol.

4. The flexibilizing capped prepolymer of claim 1, wherein the branching agent component is combined with the polyol component at an equivalent ratio of polyol to branching agent of from 1:0.01 to 1:0.4.

5. The flexibilizing capped prepolymer of claim 1, wherein the branching agent component has a number average molecular weight of from 150 g/mol to 3000 g/mol.

6. The flexibilizing capped prepolymer of claim 1, wherein the branching agent comprises from 80 wt % to 100 wt % of a triglyceride based on a total weight of the branching agent.

7. The flexibilizing capped prepolymer of claim 6, wherein the triglyceride comprises castor oil.

8. The flexibilizing capped prepolymer of claim 1, and wherein the polyisocyanate and the branching agent are combined at an equivalent ratio of polyisocyanate equivalents to branching agent equivalents of from 1.4:0.4 to 2.1:0.01.

9. A method of manufacturing a flexibilizing capped prepolymer, comprising:
catalyzing a reaction between a polyisocyanate and an isocyanate-reactive component at an equivalent ratio of polyisocyanate equivalents to isocyanate-reactive equivalents of from 1.4:1 to 2.1:1 to form an NCO-functional prepolymer, wherein the isocyanate-reactive component comprises a polyol component and a branching agent component, wherein the branching agent comprises a monoglyceride, a diglyceride, a triglyceride, or a combination thereof, and wherein the branching agent component has a number average functionality of from 3 to 6 NCO-reactive functional groups;
combining the NCO-functional prepolymer and a capping agent at an equivalent ratio of NCO-functional prepolymer equivalents to capping agent equivalents of from 1:0.9 to 1:1.2 to terminate the NCO-functional prepolymer and form the flexibilizing capped prepolymer, wherein the capping agent comprises cashew nut shell liquid and one or more of p-cresol, m-cresol, or o-cresol.

10. The method of claim 9, wherein catalyzing comprises using a catalyst comprising bismuth neodecanoate catalyst, bismuth carboxylate catalyst, dibutyltin mercaptide catalyst, or a combination thereof.

11. The method of claim 9, wherein catalyzing is performed at a temperature of from 40° C. to 120° C.

12. The method of claim 9, wherein combining the NCO-functional prepolymer with the capping agent is performed at a temperature of from 60° C. to 120° C.

13. The method of claim 9, wherein the branching agent component comprises a triglyceride having a number average molecular weight of from 300 g/mol to 3000 g/mol.

14. The method of claim 9, wherein the polyol component and the branching agent component are combined at an equivalent ratio of polyol to branching agent of from 1:0.01 to 1:0.4.

15. A one-component structural adhesive, comprising:
an epoxide resin; and
a flexibilizing capped prepolymer according to claim 1.

16. A flexibilizing capped prepolymer, comprising:
a reaction product of a polyisocyanate and an isocyanate-reactive component,
wherein the polyisocyanate and the isocyanate-reactive components are combined at an equivalent NCO:OH or NCO:NH ratio of polyisocyanate equivalents to isocyanate-reactive component equivalents of from 1.4:1 to 2.1:1,
wherein the isocyanate-reactive component comprises a polyol component and a branching agent component,
wherein the branching agent component has a number average functionality of from 3 to 6 NCO-reactive functional groups,
wherein the branching agent component comprises a monoglyceride, a diglyceride, a triglyceride, or a combination thereof,
wherein the reaction product is terminated with a capping agent to form the flexibilizing capped prepolymer, and
wherein the capping agent comprises cashew nut shell liquid in an amount of at least 5 wt % based on a total weight of the capping agent.

17. The flexibilizing capped prepolymer of claim 16, wherein the polyol component comprises a polyether polyol having a number average molecular weight of from 500 g/mol to 5000 g/mol.

18. The flexibilizing capped prepolymer of claim 16, wherein the branching agent component is combined with the polyol component at an equivalent ratio of polyol to branching agent of from 1:0.01 to 1:0.4.

19. The flexibilizing capped prepolymer of claim 16, wherein the branching agent component has a number average molecular weight of from 150 g/mol to 3000 g/mol.

20. The flexibilizing capped prepolymer of claim 16, wherein the branching agent comprises from 80 wt % to 100 wt % of a triglyceride based on a total weight of the branching agent.

* * * * *